(12) United States Patent
Giuliano et al.

(10) Patent No.: US 10,983,888 B1
(45) Date of Patent: Apr. 20, 2021

(54) SYSTEM AND METHOD FOR GENERATING DYNAMIC SPARSE EXPONENTIAL HISTOGRAMS

(71) Applicant: Amazon Technologies, Inc., Seattle, WA (US)

(72) Inventors: Andrea Giuliano, Dublin (IE); Gary Taylor, Dublin (IE); Richard Nel-Boland, Dublin (IE); Hui Zhang, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 16/218,391

(22) Filed: Dec. 12, 2018

(51) Int. Cl.
 *G06F 11/30* (2006.01)
 *G06F 16/901* (2019.01)
 *G06F 11/34* (2006.01)

(52) U.S. Cl.
 CPC ...... *G06F 11/3006* (2013.01); *G06F 11/3452* (2013.01); *G06F 11/3476* (2013.01); *G06F 16/9024* (2019.01)

(58) Field of Classification Search
 CPC ............ G06F 11/0736; G06F 11/3006; G06F 11/3409; G06F 16/22; G06F 16/24; G06F 16/248; G06F 16/954; G06F 16/2462; G06F 11/07; G06F 11/14; G06F 11/36; G06F 11/2205; G06F 11/3452; G06F 11/3476; G06F 16/9024; G06F 16/9027; G06F 9/46; G06F 9/50
 USPC ...................................................... 709/224
 See application file for complete search history.

(56) References Cited

U.S. PATENT DOCUMENTS

| | | | | |
|---|---|---|---|---|
| 4,631,411 A | * | 12/1986 | Noback | ..................... G01T 1/18 250/374 |
| 5,025,471 A | * | 6/1991 | Scott | ....................... G10L 15/02 704/237 |
| 6,025,683 A | | 2/2000 | Philipp | |
| 6,549,910 B1 | * | 4/2003 | Tate | .................... G06F 16/2462 |
| 7,889,923 B1 | * | 2/2011 | Carr | ........................ G06T 5/008 382/168 |
| 8,024,458 B1 | | 9/2011 | Buragohain | |
| 8,037,430 B2 | | 10/2011 | Papanikolaou | |
| 9,218,382 B1 | * | 12/2015 | Muntes | ............... G06F 11/3476 |
| 9,697,316 B1 | * | 7/2017 | Taylor | ................. G06F 11/3006 |

(Continued)

*Primary Examiner* — John A Follansbee
*Assistant Examiner* — James N Fiorillo
(74) *Attorney, Agent, or Firm* — Robert C. Kowert; Kowert, Hood, Munyon, Rankin & Goetzel, P.C.

(57) ABSTRACT

Systems and methods for generating dynamic sparse exponential histograms. The system includes a network-based service and a data compression engine to generate a sparse exponential histogram (SEH) representation of a distribution of a plurality of data values of a performance metric of the network-based service. The data compression engine is configured to, map each data value to a bin of an exponential histogram. Responsive to a determination that the mapped bin is not indicated in the SEH representation and that a bin quantity limit would be exceeded by adding the mapped bin, the data compression engine is configured to increase a bin size parameter by a scaling factor to expand data value ranges of the bins, merge bins indicated in the SEH representation according to the expanded data value ranges to reduce the quantity of bins indicated in the SEH representation, and indicate the scaling factor in the SEH representation.

20 Claims, 8 Drawing Sheets

(56) References Cited

U.S. PATENT DOCUMENTS

| | | | |
|---|---|---|---|
| 9,864,493 B2* | 1/2018 | Sun | H04L 67/306 |
| 10,536,155 B1* | 1/2020 | Otte | H03M 1/1004 |
| 2002/0198896 A1* | 12/2002 | Chaudhuri | G06F 16/24542 |
| 2004/0024801 A1 | 2/2004 | Hamilton et al. | |
| 2004/0064293 A1* | 4/2004 | Hamilton | H04L 43/06 |
| | | | 702/182 |
| 2007/0168696 A1* | 7/2007 | Ridel | H04L 43/00 |
| | | | 714/4.1 |
| 2009/0276729 A1* | 11/2009 | Cantu-Paz | G06F 16/954 |
| | | | 715/811 |
| 2014/0310462 A1* | 10/2014 | Waldspurger | G06F 17/40 |
| | | | 711/118 |
| 2014/0330816 A1* | 11/2014 | Dash | G06F 16/248 |
| | | | 707/722 |
| 2015/0186493 A1* | 7/2015 | Balmin | G06F 16/285 |
| | | | 707/609 |
| 2016/0226731 A1* | 8/2016 | Maroulis | G06F 16/217 |
| 2017/0024358 A1* | 1/2017 | Dunstone | G06F 16/248 |
| 2018/0024901 A1* | 1/2018 | Tankersley | G06F 16/2379 |
| | | | 707/694 |
| 2018/0082410 A1* | 3/2018 | Schulte | G06T 7/75 |
| 2018/0137220 A1* | 5/2018 | Herbig | E21B 44/00 |
| 2019/0095508 A1* | 3/2019 | Porath | G06F 11/3072 |
| 2019/0317829 A1* | 10/2019 | Brown | G06F 11/3442 |
| 2019/0370115 A1* | 12/2019 | Garvey | G06K 9/6222 |

* cited by examiner

SYSTEM AND METHOD FOR GENERATING DYNAMIC SPARSE EXPONENTIAL HISTOGRAMS

BACKGROUND

Network-based services systems perform a high quantity of tasks in response to a high quantity of requests. Analytics may be used to track performance of the network-based services in order to ensure that the systems are performing at an optimal rate. Performance metrics may be tracked in order to provide data to an analytics system. Performance monitors may be deployed at hosts of the network-based services in order to accurately track a service's handling of a given request or task. Over long periods of time, tracking the performance of a network-based service as a log may lead to large quantities of data used only to log performance. Subsequent analysis or display of the log may be computationally inefficient. Also, storage of the log may cause high volumes of space to be taken for log data.

Histograms may be utilized to track analytics data in a more efficient manner. Histograms may compress performance metrics such that less space is taken by the histogram than the log. Although a histogram may be a compressed form of a distribution of performance metrics, the histogram can face similar size constraints as with the log data. Without restrictions in generating the histogram, the storage space utilization of the histogram may reduce efficiency of the analytics system.

Figure 1:
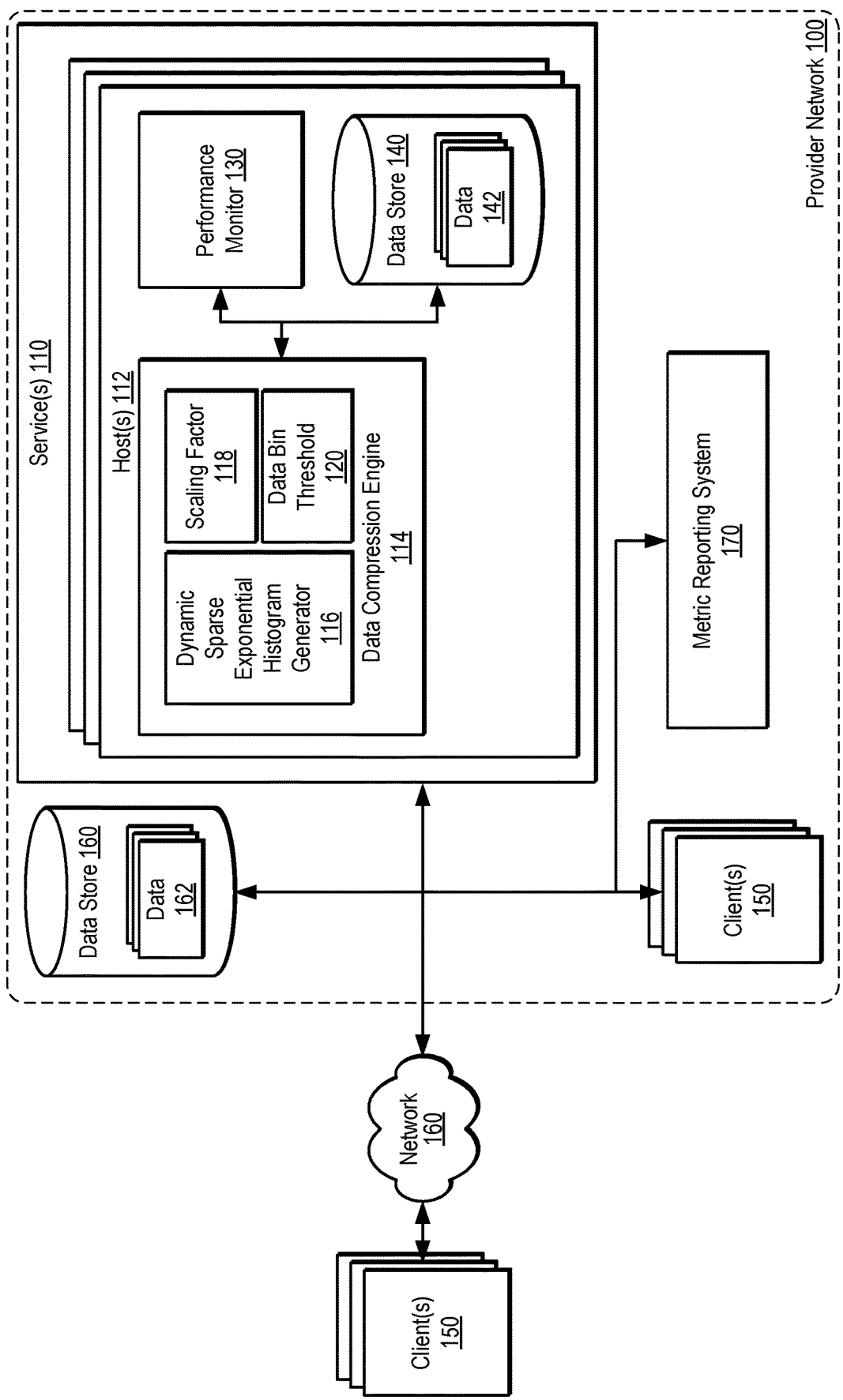
FIG. 1 illustrates a block diagram of a network-based services system that supports efficient data aggregation with sparse exponential histograms, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. As used throughout this application, the phrase "based on" a factor means based at least in part on the factor, rather than exclusively based on the factor, such that an event "based on" the factor can also be influenced or modified by another factor.

DETAILED DESCRIPTION

Various embodiments of systems and processes for generating dynamic sparse exponential histograms are disclosed herein. In one aspect of the invention, a system is disclosed. The system includes a network-based service implemented by a plurality of computers, where the network-based service is configured to provide one or more services to a plurality of clients over a network. The system also includes a data compression engine implemented on one or more computing devices and configured to generate a sparse exponential histogram (SEH) representation of a distribution of a plurality of data values of a performance metric of the network-based service. To generate the sparse exponential histogram representation, the data compression engine is configured to, for each data value of the plurality of data values, map the data value to a bin of an exponential histogram having a plurality of bins each representing a data value range according to a bin size parameter for the exponential histogram. The data compression engine is also configured to determine whether the mapped bin is currently indicated in the SEH representation of the distribution, wherein for each bin indicated in the SEH representation, the SEH representation includes a count of the quantity of data values mapped to that bin. The data compression engine is configured to, responsive to a determination that the mapped bin is not currently indicated in the SEH representation, determine whether adding an indication of the mapped bin would exceed a bin quantity limit for the SEH representation. The data compression engine is configured to, responsive to a determination that the bin quantity limit would be exceeded increase the bin size parameter by a scaling factor to expand the respective data value range covered by each bin. The data compression engine is configured to merge bins indicated in the SEH representation according to the expanded data value ranges to reduce the quantity of bins indicated in the SEH representation to be below the bin quantity limit. The data compression engine is configured to indicate the scaling factor in the SEH representation.

In another aspect of the invention, a method is disclosed. The method includes for each data value of a plurality of data values of a performance metric of the network-based service, mapping the data value to a bin of an exponential histogram of a distribution of the plurality of data values having a plurality of bins each representing a data value range according to a bin size parameter for the exponential histogram. The method also includes determining whether the mapped bin is currently indicated in a sparse exponential histogram (SEH) representation of the distribution. The method further includes responsive to a determination that the mapped bin is not currently indicated in the SEH representation, determining whether adding an indication of the mapped bin would exceed a bin quantity limit for the SEH representation. The method also includes responsive to a determination that the bin quantity limit would be exceeded increasing the bin size parameter by a scaling factor, merging bins indicated in the SEH representation according to the bin size parameter, and indicating the scaling factor in the SEH representation.

In yet another aspect of the invention, one or more non-transitory, computer-readable storage media are disclosed. The one or more non-transitory, computer-readable storage media store instructions that are executable one or across one or more processors. The instructions cause the one or more processors to for each data value of a plurality of data values of a performance metric of the network-based service, map the data value to a bin of an exponential histogram of a distribution of the plurality of data values having a plurality of bins each representing a data value range according to a bin size parameter for the exponential histogram. The instructions cause the one or more processors to also determine whether the mapped bin is currently indicated in a sparse exponential histogram (SEH) representation of the distribution. The instructions cause the one or more processors to further responsive to a determination that the mapped bin is not currently indicated in the SEH representation, determine whether adding an indication of the mapped bin would exceed a bin quantity limit for the SEH representation. The instructions cause the one or more processors to responsive to a determination that the bin quantity limit would be exceed, increase the bin size parameter by a scaling factor, merge bins indicated in the SEH representation according to the bin size parameter, and indicate the scaling factor in the SEH representation.

FIG. 1 illustrates a block diagram of a network-based services system that supports efficient performance data aggregation with sparse exponential histograms, according to one embodiment. "Sparse exponential histogram" and "sparse exponential histogram representation" may be used interchangeably to refer to a data structure configured to store or convey information that would indicate a sparse exponential histogram when analyzed. In general, a network-based service system 100 may provide one or more network-based services 110 (e.g., storage, virtual compute) to external clients (not explicitly shown). Network-based service system 100 may be implemented on one or more computers and may be implemented as a distributed network. The network-based service system 100 may also be referred to as a provider network, according to some embodiments. In some embodiments, network-based services 110 may be implemented by computers is geographically disperse data centers. Administrators of the network-based services may implement one or more performance monitors to monitor one or more performance metrics of the network-based service(s). Performance monitor 130 may monitor, for example, performance metrics (e.g., latency, CPU utilization) at a single host and/or a multiple hosts. A performance monitor may be configured to record the performance data in logs and/or store the performance data. Data compression engine 114 may be implemented to parse performance data received from the performance monitor and/or aggregated data from sparse exponential histogram generator 116. Sparse exponential histogram generator 116 may be implemented to use the performance data to generate sparse exponential histograms. Sparse exponential histogram generator 116 may create histograms for a given metric/dimension pair. An example of a monitored metric, as described above, may be latency. The dimension may represent a level and/or grouping for the metrics. For example, a dimension may be a single host in the network-based service, a CPU, a data center and/or a network-based service. The sparse exponential histogram representation may represent a range of values for a metric that may be divided into data bins or alternatively referred to as buckets or bins. The range of values from the performance data and total number of data bins defines the granularity or range of each data bin (e.g., x-axis of histogram). The data value range for each data bin increases exponentially. The exponential aspect of the histogram compresses the performance data and contributes to an increase in computational speed. The histogram representation includes a frequency count (e.g., y-axis of histogram representation) for each data bin reflecting the number of occurrences of values within the performance data from the performance monitor that fall within the range for the respective data bin. In some embodiments, the frequency count for each data bin in the histogram representation may be based on a sample or weighted sample of the performance data. In some embodiments, the frequency count may be a floating point or other non-integer value. Data bins that have a zero frequency count may not be represented in the sparse exponential histogram. This may minimize storage used on data store 140, stored as data 142, required for the histograms since data bins that have zero entries may not have a data structure element in storage assigned to them. The histogram will be described in further detail below.

System 100 comprises one or more network-based services 110 configured to offer one or more services 110 to one or more clients 150. Network-based services 110 may be configured to provide network-based compute services, or storage services to provide data backup services to clients, for example. To monitor performance metrics, service-level or host-level performance monitor 130 may be implemented. Examples of performance metrics that may be monitored are latency, CPU utilization and/or storage utilization. Performance monitor 130 may be configured to monitor any number of performance metrics within the network-based service. The performance metrics may be monitored in one or more dimensions. Examples of dimensions are performance for a single processor, single host, multiple hosts, service type, etc. Performance monitor 130 may be configured to gather the one or more metrics for one or more dimensions continuously or at a given time interval (e.g., 1 minute, 5 minutes etc.). The performance data may be recorded and/or stored (e.g., logs, records, etc.) in data store 140 as data 142 and subsequently transmitted to or accessed by data compression engine(s) 114.

Data compression engine 114 may be configured to aggregate performance data generated by a host-level or service-level performance monitor 130 and generate sparse exponential histograms of the performance data according to a schema. As described above, a schema may be defined (e.g., by a system administrator) to specify a metric, dimension and/or time interval of interest for which data compression engine 114 generates sparse exponential histograms of performance data accessed from performance monitor 130 or data store 140. Data compression engine 114 may parse the data into a dimension/metric pair for a given time interval according to the schema and create a histogram using sparse exponential histogram generator 116.

Sparse exponential histogram generator 116 may be configured to generate a sparse exponential histogram from the performance data captured by performance monitor 130. Sparse histogram generator 116 may generate a sparse exponential histogram of the performance data for a dimension and metric of interest. A dimension may be a given configuration and/or level within the network-based service. A dimension may be a single host (e.g. one or more computers), multiple host and/or all hosts within a network-based service, for example. As another example, a dimension may be a single processor, virtual machine or process in a single host. The metrics may be, for example, latency, CPU utilization and/or storage utilization as described above. Sparse exponential histogram generator 116 may be configured to determine the bin size parameter of data bins for the histogram, e.g., based on the range of values for the performance metric under evaluation. The number of data bins for the sparse exponential histogram is not fixed, in some embodiments. In alternate embodiments, sparse exponential histogram generator 116 may determine the number of data bins in addition to the bin size parameter of the data bins. Examples of determining the number of data bins and the bin size parameter of the data bins are discussed below. The data bins may be represented on the x-axis on a logarithmic scale depending on the performance metric under evaluation. In other words, the data value range for each data bin may increase according to an exponential term from one data bin to the next.

As data values are being added to the sparse exponential histogram, a quantity of data bins may become greater than or equal to data bin threshold 120. Data bin threshold 120 may be pre-determined for a particular client in order to reduce memory consumption and to improve data compression efficiency. In some embodiments, data bin threshold 120 may be a fixed number that may limit the quantity of data bins that are part of the sparse exponential histogram. In some respects, limiting the quantity of data bins may improve memory usage and efficiency by reducing the amount of memory allocated to previously adjacent data bins. Reducing memory usage may also improve subsequent storage, such as storage to data store 140 and/or data store 160.

Based on a determination that the quantity of data bins is greater than or equal to data bin threshold 120, sparse exponential histogram generator 116 may scale the sparse exponential histogram according to scaling factor 118. Scaling factor 118 may correspond to a number of times in which the sparse exponential histogram was scaled. In some embodiments, scaling factor 118 may be a multiple of a base scaling factor that may be applied responsive to scaling the sparse exponential histogram. For example, a base scaling factor may be equal to two (2) such that scaling factor 118 indicates how many times the sparse exponential histogram was scaled by two, e.g., halved. In some embodiments, scaling factor 118 may be used as an exponential increase of the base scaling factor.

Sparse histogram generator 116 may be configured to populate the histogram with the parsed performance data. The y-axis of the sparse exponential histogram may represent the frequency count for each data bin of the parsed performance data values that fall within the respective range assign to each data bin. The populated histogram may be transmitted and/or stored in data store 140, data store 160 and/or data compression engine 114. To save storage space and compute time, data bins of the exponential histogram with zero entries may not be stored or transmitted, resulting in a sparse exponential histogram representation of the parsed performance data. The details of generating the sparse exponential histograms will be discussed in later figures.

Data store 140 may include, but is not limited to disk drives, solid state storage devices, and/or other magnetic or optical storage. Examples of disk drives are optical drives and magnetic recording disk drives. Data store 140 may be configured as a single disk drive and/or multiple disk drives (e.g., RAID). Data store 160 may include, but is not limited to disk drives, solid state storage devices, and/or other magnetic or optical storage. Examples of disk drives are optical drives and magnetic recording disk drives. Data store 160 may be configured as a single disk drive and/or multiple disk drives (e.g., RAID).

In addition, sparse exponential histogram generator 116 may also include a system level sparse histogram generator. The system level sparse histogram generator may be implemented to perform generating histograms, aggregating data and/or histograms and/or storing the performance data and/or histograms for all of the network-based services within the system. System level data compression engine may provide a performance data aggregation and reporting service for the various network-based services 110. As such, network-based services 110 may be clients of data compression engine 114. Data compression engine 114 may gather performance data and/or sparse exponential histograms from each network-based service 110. In some embodiments, aggregation and sparse exponential histogram generation of performance data may be performed on the client side (e.g., at network-based service 110). Thus, instead of requiring larger amounts of raw performance data to be transmitted from network-based services 110 to data compression engine 114, more compact sparse exponential histogram representations of the performance data for each service may be transmitted to data compression engine 114. Data compression engine 114 may generate reports from the received and/or stored sparse exponential histogram representations and/or perform additional aggregations (e.g., at larger time or system dimensions) and generate new sparse exponential histogram representations accordingly. In some embodiments, data compression engine 114 may aggregate stored sparse exponential histograms to create aggregated sparse exponential histograms based on a schema or as requested by user input. For example, sparse exponential histograms representations for latency of a network-based service at different data centers may be stored separately for each data center, and the stored sparse exponential histogram representations may later be aggregated from stored representations to create a global latency sparse exponential histogram representation for the network-based service for all data centers.

In addition, data compression engine 114 may be configured to receive performance data from clients 150 external to network-based services system 100. The external client data may comprise metrics values for various dimensions and/or time intervals similar to the performance data discussed above. Data compression engine 114 may be configured to generate reports and/or sparse exponential histograms for internal and/or external clients according to a schema. The schema may be provided by the client 150, in some embodiments.

The system level sparse exponential histogram generator may be configured to generate sparse exponential histograms from performance data for the network-based services and/or performance data received from external clients. The system level sparse exponential histogram generator may parse the performance data into a dimension/metric pair for a given time interval as described above. The system level sparse exponential histogram generator may generate the sparse exponential histogram in a manner similar to that described above for sparse exponential histogram generator 116.

For example, a network-based service may have multiple clients 150. The administrator of the network-based service may want to forecast the need for new hardware and/or software needed to ensure that the multiple clients experience quality service with no down time while allowing for room for expansion for new clients. To assess this, the administrator may track a metric such as latency of the network-based service. The administrator may configure performance monitor 130 to monitor the latency for requests handled at each host in the network-based service along with other performance metrics within the network-based service. Performance monitor 130 may continuously provide the performance data for the sparse exponential histogram generator 116. Sparse histogram generator 116 may parse the latency data from other performance monitor data and create the sparse exponential histogram representation of latency for requests handled at the given host during a given time interval. For example, sparse histogram exponential generator 116 may populate a sparse exponential histogram with the 1-minute latency determined from the parsed performance data for a 1-minute time interval. Data compression engine 114 may further combine the data into a composite histogram of 5-minute interval for a single host to show the latency over a longer time period. In addition, data compression engine 114 o may combine the data to show the latency for all hosts of a given service during the 1 and 5-minute time intervals. The composite sparse exponential histograms generated by data compression engine 114 may be transmitted and/or stored in data store 140 of another host and/or system level sparse histogram generator 116 of another host for further analysis and/or post-processing. For example, an administrator may want to evaluate the latency across multiple sites (e.g., geographic locations) for a given time period. The data compression engine 114 may retrieve data for the multiple sites from data store 140 to create a new composite histogram reflecting the latency for multiple sites for a given time period.

Dynamic sparse exponential histogram generator 116 may be configured to generate a final sparse exponential histogram representation, according to some embodiments. The final sparse exponential histogram representation may include a final scaling factor indicating a final scale applied to the bin size parameter. The final sparse exponential histogram representation may include an indication of each bin for which at least one data value of the distribution mapped to one of the data value ranges of the exponential histogram determined according to the bin size parameter scaled according to the final scaling factor. In some embodiments, different data bins may have respective, different scaling factors indicating that the different data bins were scaled differently. The final sparse exponential histogram representation may include a respective count of data values of the distribution mapped to each bin indicated in the final sparse exponential histogram representation. The final sparse exponential histogram representation may be stored to data store 140 and/or data store 160. The final sparse exponential histogram representation may be sent to clients 150 for further processing.

Additional processing on the final sparse exponential histogram representation may include generating a histogram of the distribution based on the final sparse exponential histogram representation. In some embodiments, metric reporting system 170 may be included as part of services 110. In other embodiments, metric reporting system 170 may be located at one or more other computing devices in provider network 100. In yet other embodiments, metric reporting system 170 may be deployed at clients 150 to be executed locally to the clients. To generate the histogram, metric reporting system 170 may identify how many bins are in the final sparse exponential histogram representation. For example, metric reporting system 170 may determine a quantity of bins of the histogram and a corresponding data value range for each bin according to the bin size parameter scaled according to the final scaling factor from the final sparse exponential histogram representation. Metric reporting system 170 may determine a magnitude of frequency counts for each of the bins. For example, metric reporting system 170 may determine a height for each bin of the histogram according to the respective counts from the final sparse exponential histogram representation, where for bins not indicated in the final sparse exponential histogram representation the height is determined to be zero. Metric reporting system 170 may generate the histogram from the determined data. For example, metric reporting system 170 may generate presentation data for the histogram according to the determined quantity of bins, the determined data value range for each bin, and the determined height for each bin.

Metric reporting system 170 may also be configured to perform additional analysis based on the final sparse exponential histogram representation. In some embodiments, metric reporting system 170 may be configured to perform a statistical analysis based on counts for respective data bins in the final sparse exponential histogram representation. For example, metric reporting system 170 may identify particular statistics from analyzing various counts across one or more data bins. In some embodiments, metric reporting system 170 may perform the statistical analysis without generating presentation data to regenerate the histogram. For example, metric reporting system 170 may provide statistical analysis and return individual statistical values without utilizing computational cycles to generate an additional visual display for the histogram that may not be needed for a particular analysis.

Figure 2:
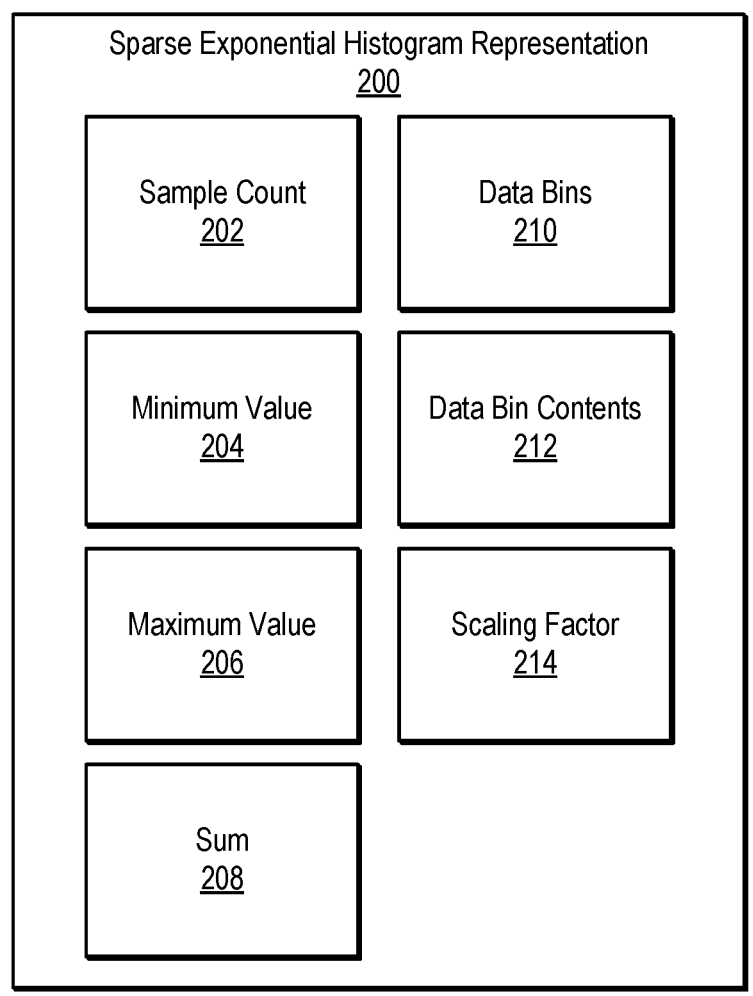
FIG. 2 illustrates a block diagram of a data structure for a sparse exponential histogram representation, according to some embodiments.

FIG. 2 illustrates a block diagram representation of a data structure for a sparse exponential histogram representation 200, according to some embodiments. Sparse exponential histogram representation 200 may represent a distribution of data (e.g., uniform, bell curve, etc.). Given a distribution, a characteristic such as the $99^{th}$ percentile may be determined. Sparse exponential histogram representation 200 may include one or more statistical data types that indicate statistics about the metrics and/or dimensions tracked by the sparse exponential histogram representation 200. In some embodiments, the sparse exponential histogram representation 200 may be represented by an array that includes the one or more statistical data types, such as an unbounded byte array. In other embodiments, the sparse exponential histogram representation 200 may be organized in a key-value structure. In yet other embodiments, the sparse exponential histogram representation 200 may be stored as comma-separated values.

The one or more statistical data types may include sample count 202, minimum value 204, maximum value 206, and sum 208, according to some embodiments. The sparse exponential histogram representation 200 may include a data structure that identifies data bins 210, a data structure that stores data bin contents 212, and scaling factor 214. Sample count 202 may include a numerical representation of a total number of data values that were tracked or aggregated in generating the sparse exponential histogram representation 200. In some embodiments, sample count 202 may be tracked during generation of the sparse exponential histogram representation 200 in response to receiving a new data value. In other embodiments, sample count 202 may be periodically generated based on a summation of data bin contents 212.

Minimum value 204 may include a numerical representation of a lowest value observed in the sparse exponential histogram representation 200, according to some embodiments. For example, minimum value 204 may indicate a lower bound of the data values already aggregated in the sparse exponential histogram representation 200. Maximum value 206 may include a numerical representation of a highest value observed in the sparse exponential histogram representation 200, according to some embodiments. For example, maximum value 206 may indicate an upper bound of the data values already aggregated in the sparse exponential histogram representation 200. Minimum value 204 and maximum value 206 may not necessarily be limiting on additional data values to be provided to the sparse exponential histogram representation 200. In some embodiments, minimum value 204 and maximum value 206 may be updated when a new data value in the sparse exponential histogram representation 200 is less than minimum value 204 or greater than maximum value 206. For example, a new data value may be lower than minimum value 204 and subsequently be stored as minimum value 204. Similarly, the new data value may exceed maximum value 206 and subsequently be stored as maximum value 206. In some situations, data values that are less than minimum value 204 or data values that are greater than maximum value 206 are considered outlier values such these data values may be added to a lowest data bin or a highest data bin, respectively.

Sum 208 may include a numerical representation of a summation of all data values used in generation of the sparse exponential histogram representation 200. For example, as data values are observed in the distribution, sum 208 may be incremented by the data values. In another example, sum 208 may be calculated by traversing the data values stored in a larger database of logged data values. By calculating sum 208 as data values are being received and observed, later requests to retrieve sum 208 may be processed faster than traversing the data values in the larger database, thereby saving on processing or other computational costs. In some embodiments, sparse exponential histogram representation 200 may include additional statistical information such as an average of data values. The average may be calculated by dividing sum 208 by sample count 202. The average may be compared to minimum value 204 and maximum value 206 to determine full scope of the observed metric and/or distribution by indicating a difference between the average and minimum value 204 or maximum value 206.

Data bins 210 may include a data structure that represents bin identifiers which correspond to data bins at a data store, according to some embodiments. For example, data bins 210 may include an array of bin identifiers that identify each of the data bins in sparse exponential histogram representation 200. In some embodiments, data bins 210 may be limited in number or quantity to reduce memory consumption in the distribution of sparse exponential histogram representation 200. In other embodiments, reduced memory consumption may allow a high level of compression of the data values in order to provide statistical data in the form of sparse exponential histogram representation 200 without maintaining each data value in the distribution.

Data bin contents 212 may include a data structure that represents contents of data bins 210, according to some embodiments. For example, data bin contents 212 may include an array of numerical values for corresponding data bins of data bins 210. Data bin contents 212 may represent a quantity of data values which are included within respective bin sizes of respective ones of data bins 210. For example, a particular data bin content may indicate that a particular quantity of data values have been observed for a range of values for a particular metric in performance data.

Scaling factor 214 may include a numerical representation of a quantity of times in which a distribution has been scaled in sparse exponential histogram representation 200, according to some embodiments. In some embodiments, scaling factor 214 may be incremented when a bin quantity threshold is exceeded by allocating new data bins during generation of sparse exponential histogram representation 200. In some embodiments, scaling factor 214 may have different values when associated with different data bins. For example, different data bins of data bins 210 may have been scaled at different intervals such that a first subset of data bins 210 may have a different scaling factor than a second subset of data bins 210. The different subsets of data bins 210 have corresponding, respective scaling factors that must be maintained to ensure proper management of the sparse exponential histogram representation.

Figure 3:
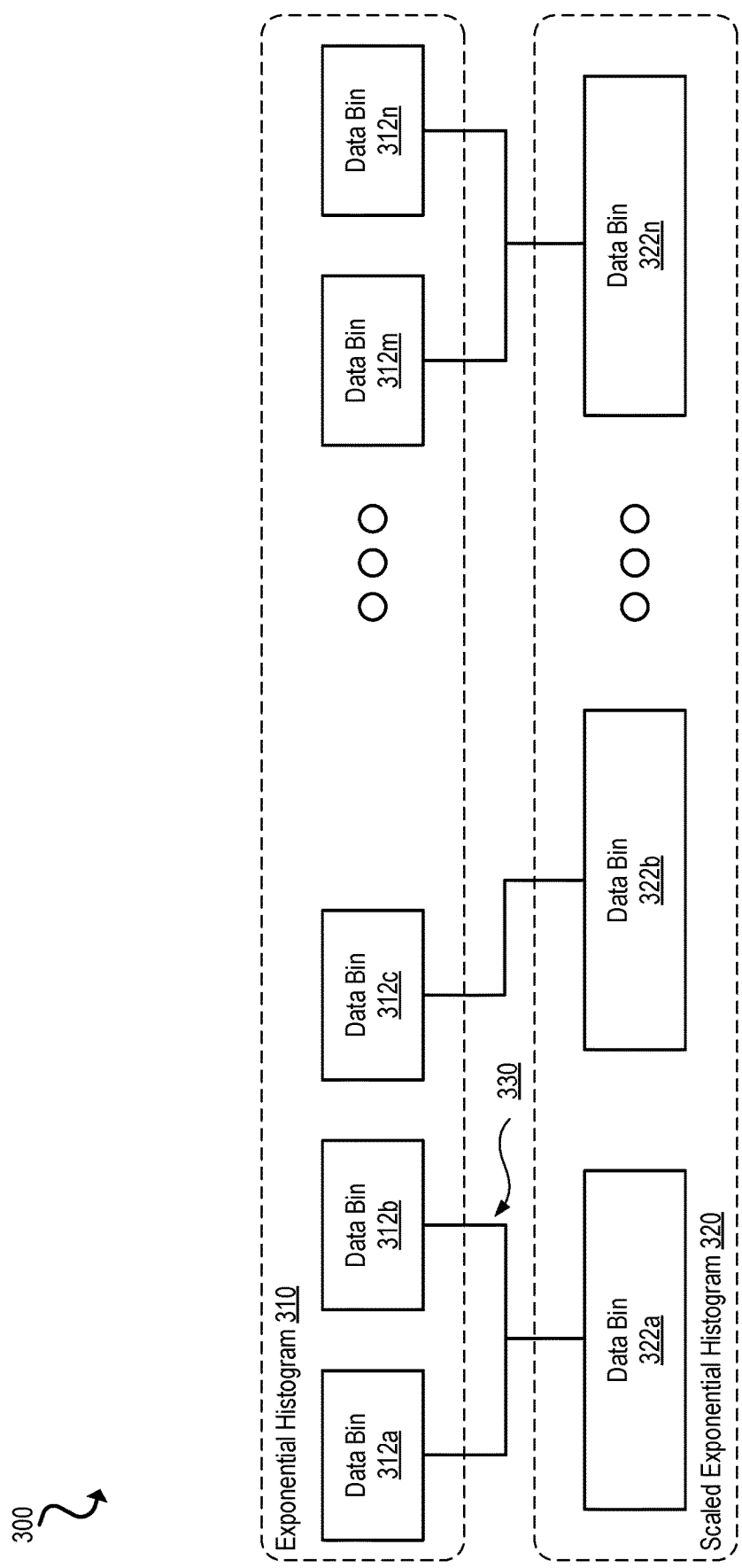
FIG. 3 illustrates a logical diagram of data bins of a sparse exponential histogram being merged into respective data bins of a dynamically scaled sparse exponential histogram, according to some embodiments.

FIG. 3 illustrates a logical diagram of data bins 312a . . . n of a sparse exponential histogram 310 being merged into respective data bins 322a . . . n of a dynamically scaled sparse exponential histogram 320, according to some embodiments.

Data bins 312a . . . n may be merged according to merge operation 330 responsive to a determination that a total quantity of data bins 312a . . . n satisfies a bin quantity threshold, according to some embodiments. For example, data bins 312a . . . n may be merged based on a determination that the total quantity of data bins 312a . . . n exceeds a maximum bin quantity threshold. In some embodiments, the total quantity of data bins 312a . . . n is compared to the bin quantity threshold when a new data bin is attempted to be allocated or used in a sparse exponential histogram representation.

As an illustrative, non-limiting example, sets of two data bins are merged according to merge operation 330 based on a scaling factor. The scaling factor may indicate that two data bins are to be merged responsive to the determination that the total quantity of data bins 312a . . . n exceeds the maximum bin quantity threshold. In some embodiments, adjacent data bins in the sparse exponential histogram may be merged. For example, data bin 312a and data bin 312b are adjacent in the sparse exponential histogram representation and are targeted to be merged.

Merge operation 330 may cause two or more data bins of sparse exponential histogram 310 to be merged such that combined ranges of the two or more data bins and combined contents of the two or more data bins are merged into one merged data bin, according to some embodiments. For example, data bin 312a and data bin 312b may be merged by merge operation 330 into data bin 322a of scaled sparse exponential histogram 320. Merge operation 330 may include combining the counts in the sparse exponential histogram representation for data bin 312a and data bin 312b that are covered by a same expanded data value range. In some embodiments, merge operation 330 may record minimum and maximum values of the two or more data bins to the merged data bin. For example, a minimum value of data bin 312a may be recorded as a minimum value of data bin 322a, and a maximum value 312b may be recorded as a maximum value of data bin 322a. In other embodiments, merge operation 330 may calculate a sum for the two or more data bins. For example, merge operation 330 may retrieve respective sums of data bin 312a and data bin 312b and add the respective sums to calculate a cumulative sum for both data bin 312a and data bin 312b. The cumulative sum may be recorded as a sum of data bin 322a. Calculating the cumulative sum based on known sums of the two or more data bins allows an improvement of computational speed instead of traversing the data values associated with the two or more data bins to generate the cumulative sum.

Merge operation 330 may cause a single data bin, e.g., data bin 312c to be expanded to cover a larger data value range. For example, data bin 312c may be scheduled to be merged with an adjacent data bin that may be empty or have zero associated data values. Thus, data bin 312c may have its data value range expanded to the same effect of merging data bin 312c with an adjacent data bin having values in the data value range. Data bin 312c may be expanded in data value range to be data bin 322b of scaled sparse exponential histogram 320 such that the data value range of data bin 322b is larger than data value range of data bin 312c. The count of data bin 322b may be equal to the count of data bin 312c as a result of merge operation 330.

In some embodiments, merge operation 330 may be targeted toward data bins 312a . . . n that may have frequency counts that are relatively lower than other data bins 312a . . . n in sparse exponential histogram 310. For example, when the distribution is generally expressible as a bell or Gaussian curve, merge operation 330 maybe targeted toward data bins 312a . . . n that are outside of a standard deviation of the distribution. Minimizing the scaling of higher frequency count data bins may preserve accuracy or precision of the data bins in the standard deviation.

In order for the sparse exponential histogram to properly track the variable scaling factor across different groupings of data bins, the sparse exponential histogram representation may be split into two or more distinctly scaled portions. In some embodiments, the sparse exponential histogram representation may also include additional data that indicates a number of groupings of data bins 312a . . . n. Additionally, the sparse exponential histogram representation may also include additional data that indicates respective scaling factors that correspond to respective groupings of data bins 312a . . . n to maintain different scaling factors for different groupings.

Figure 4:
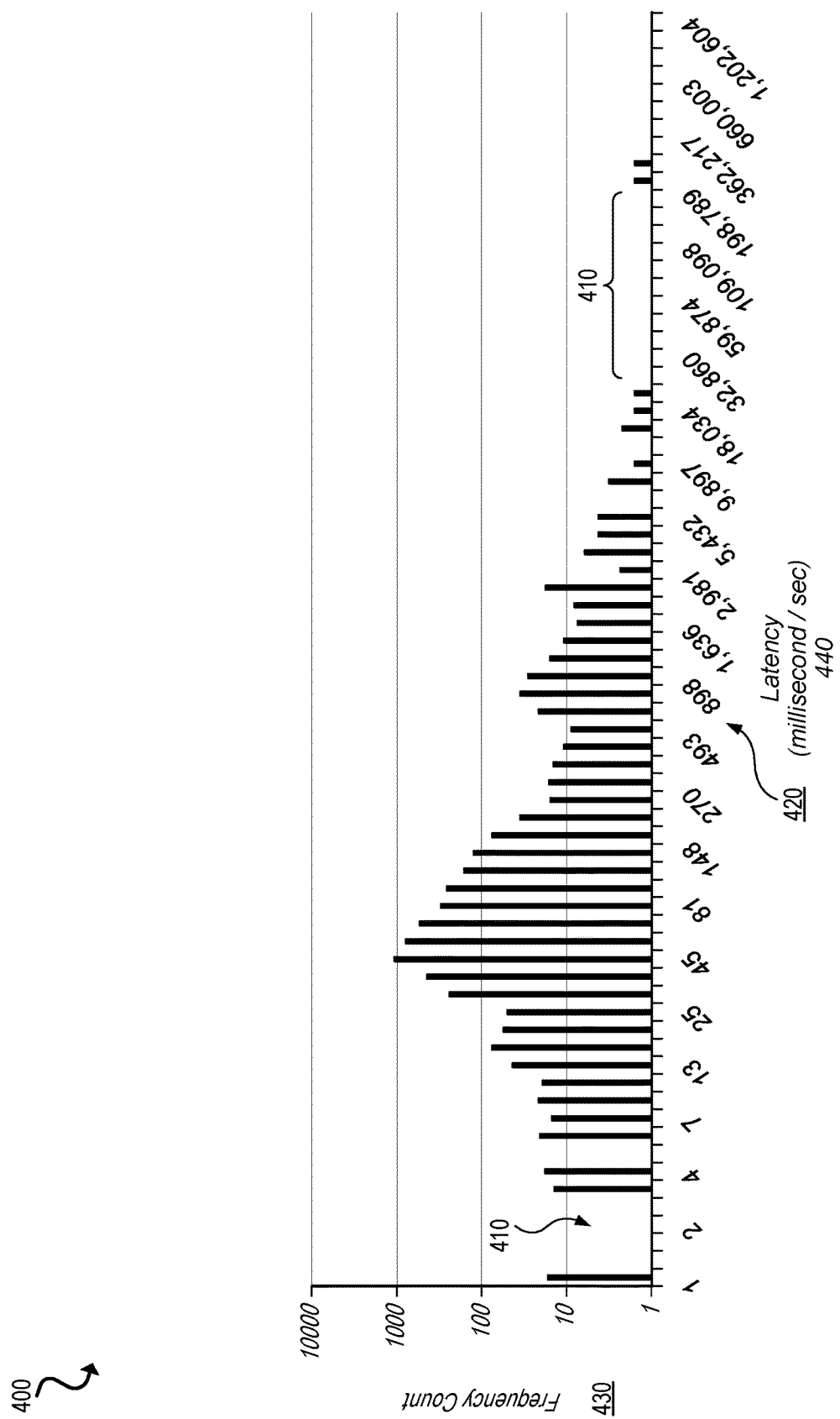
FIG. 4 illustrates an example of a plot of a sparse exponential histogram representation of the latency of a single host, according to some embodiments.

FIG. 4 illustrates an example of a plot 400 of a sparse exponential histogram representation of the latency of a single host, according to one embodiment. In general, as described above, a sparse exponential histogram representation may represent a dimension/metric pair for a given time interval. As in this example, a dimension/metric pair is a single host/latency representation for a given time interval. The x-axis represents the data bin (e.g., range of values) on a logarithmic scale where each data bin range exponentially increases in size. The y-axis represents the frequency count for each value in each respective data bin, also on a logarithmic scale in this example.

Frequency count 430 may be represented on the y-axis. The frequency count represents that number of occurrences of latency values for each respective data bin value range. As depicted, one can see the scale on the y-axis for the frequency count increases by orders of magnitude. Latency 440 may be measured in milliseconds and may be represented on the x-axis on a logarithmic scale. Generating the graph with these representations may create a more concise plot when a wide range of values is expected, such as for data distributions have long tails.

In the graph depicted at 420, the data bin having an upper-end value of 898 milliseconds has 100 entries. In the data bin in 420, the 100 entries may not all be exactly 898 milliseconds. As discussed herein, each data bin may have a bin size parameter to allow for a range of values within each respective data bin. For example, the data bin at 420 may include values ranging between the maximum+1 of the adjacent data bin to the maximum of the current data bin (e.g., 898 milliseconds).

As indicated at 410, there are several data bins with zero entries. This indicates that those values were not measured during monitoring (e.g. performance monitor 130 in FIG. 1) and in the performance data received by the sparse histogram generator (e.g., sparse exponential histogram generator 116 in FIG. 1). When the sparse exponential histogram representation is transmitted and/or stored, the sparse data bins will not be represented in the data structure, thus saving storage and compute resources.

Figure 5:
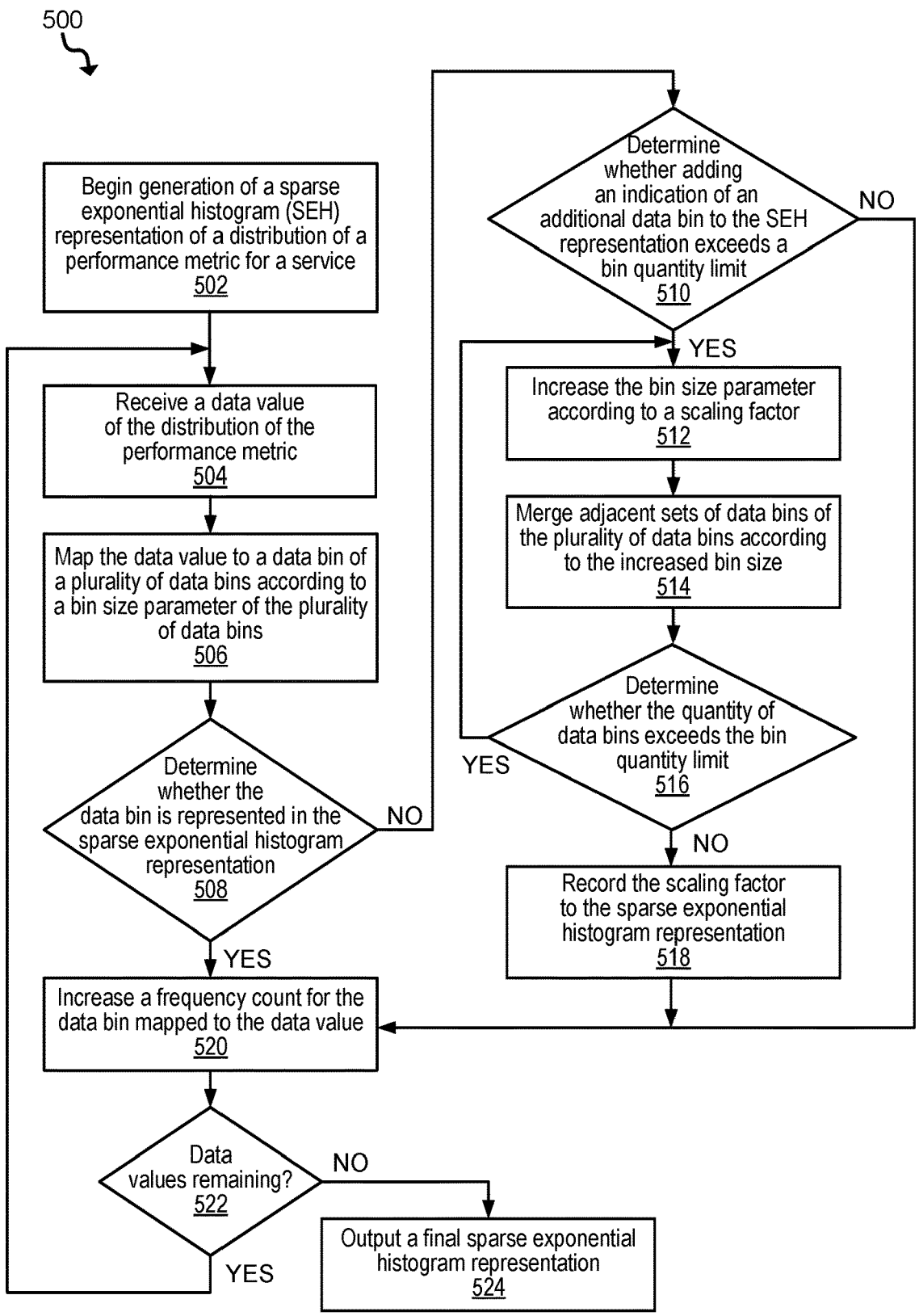
FIG. 5 illustrates a flowchart diagram of a method for generating a sparse exponential histogram representation of a distribution of a performance metric for a service, according to some embodiments.

FIG. 5 illustrates a flowchart diagram of a method 500 for generating a sparse exponential histogram representation of a distribution of a performance metric for a service, according to some embodiments. The method 500 may be performed by one or more of data compression engine 114 of dynamic sparse exponential histogram generator 116 of FIG. 1.

The method 500 includes beginning generation of a sparse exponential histogram (SEH) representation of a distribution of a performance metric for a service, at 502. The method 500 also includes receiving a data value of the distribution of the performance metric, at 504. In some embodiments, the performance metric may be measured by performance monitor 130 of FIG. 1. In some embodiments, the data value may be one of a plurality of data values of the distribution. For example, a performance monitor may measure one of many performance metrics over a period of time in order to track long-term performance of a service.

In some embodiments, receiving the data value may include receiving a second histogram or a second sparse exponential histogram representation. For example, the data value may be a part of a second histogram that is to be merged with the sparse exponential histogram representation that begins generation at 502.

The method also includes mapping the data value to a data bin of a plurality of data bins according to a bin size parameter of the plurality of data bins, at 506. In some embodiments, mapping the data value to the data bin includes calculating the data bin based on the data value itself. For example, bin size parameter may be expressed as a function of scaling factor and a constant precision loss driver (ε) by the following equation:

$$binSize_0 = \ln(1+\varepsilon), \varepsilon=0.1$$

Mapping the data value to the data bin may be expressed by the following equation:

$$dataBin = \frac{\ln|dataValue|}{\ln(1+\varepsilon)}, \varepsilon = 0.1$$

The method 500 also includes determining whether the data bin is represented in the sparse exponential histogram representation, at 508. The sparse exponential histogram representation may include a data structure that identifies each data bin represented in the sparse exponential histogram representation, according to some embodiments. For example, the sparse exponential histogram representation may include an array of bin identifiers that identify which data bins have corresponding data values that are non-zero. The array of bin identifiers may be searchable based on the calculated data bin from the above equation(s). If the search returns negative, then the data bin is zero and thus not represented in sparse exponential histogram representation, and the method continues to 510. If the search returns positive, then the data bin is represented in the sparse exponential histogram representation, and the method continues to 518.

In response to a determination that the data bin is not represented in the sparse exponential histogram representation, the method 500 includes determining whether adding an indication of an additional data bin to the sparse exponential histogram representation would exceed a bin quantity limit, at 510. In some embodiments, the bin quantity limit may reduce memory consumption by limiting the quantity of data bins represented in the sparse exponential histogram representation. Based on a determination that adding the indication of the additional data bin would exceed the bin quantity limit, the method 500 continues to 512. Based on a determination that adding the indication of the additional data bin would not exceed the bin quantity limit, the method 500 continues to 518.

Based on a determination that adding the indication of the additional data bin would exceed the bin quantity limit, the method 500 includes increasing the bin size parameter according to a scaling factor, at 512. In some embodiments, the scaling factor may be incremented responsive to increasing the bin size parameter. For example, the scaling factor may be increased by one (1) for each time the sparse exponential histogram representation needs to be scaled. Subsequent bin size parameters after scaling data bins may be determined by the following equation, based on previous bin size parameters:

$$binSize_i = 2 * binSize_{i-1}, i = [0,9]$$

Alternatively, a given bin size parameter may be expressed as a function of scaling factor by the following equation:

$$binSize_i = 2^{scalingFactor} * \ln(1+\varepsilon), \varepsilon = 0.1$$

Based on the definition of dataBin and binSize above, the data bin may be subsequently determined based on the following equation:

$$dataBin = \frac{\ln|dataValue|}{2^{scalingFactor} * \ln(1+\varepsilon)}, \varepsilon = 0.1$$

In some embodiments, the scaling factor may be associated with respective subsets of data bins in the sparse exponential histogram representation. For example, a first subset of data bins may have a first scaling factor, and a second subset of data bins may have a second scaling factor. Uniform scaling may not be appropriate for every sparse exponential histogram representation. In some embodiments, the bins to be merged may be determined from a total quantity of data bins in the sparse exponential histogram representation. For example, the bins to be merged may be determined based on relative counts for each of the bins or a subset of the bins. For example, accuracy of counts for the first subset of data bins may be maintained in situations where the first subset of data bins represents a larger set of data values relative to counts for the second subset of data bins. In this example, the first subset of data bins may represent data value ranges with more data values associated, and the second subset of data bins may represent data values that are more sparsely and widely distributed across data value ranges. The sparse exponential histogram may correlate particular data bins with respective scaling factors.

The method 500 also includes merging adjacent sets of data bins of the plurality of data bins according to the increased bin size, at 514. In some embodiments, merging the adjacent sets of data bins may be performed by a merge operation including combining the counts in the sparse exponential histogram representation for adjacent bins indicated in the sparse exponential histogram representation that are covered by a same expanded data value range. In some embodiments, the merge operation may record minimum and maximum values of the two or more data bins to the merged data bin. Merging the adjacent sets of data bins may have the effect of reducing the quantity of data bins to be less than the bin quantity limit in order to free up space in the sparse exponential histogram representation for additional data bins.

The method 500 may also include determining whether the quantity of data bins after merging exceeds the bin quantity limit, at 516. In some situations, merging the adjacent sets of data bins may result in one or more data bins being merged with empty data bins (e.g., data bins having zero corresponding data values). Merging data bins with empty data bins may not necessarily reduce the quantity of data bins such that adding the indication of the additional data bin may still exceed the bin quantity limit. Merging data bins may be an iterative process to ensure that the bin quantity limit is not exceeded. If the quantity of data bins still exceeds the bin quantity limit, the method 500 may return to 512 in order to perform additional scaling of the sparse exponential histogram. For example, the bin size parameter may be further increased by the scaling factor. An additional merge of adjacent sets of data bins may be performed in order to lower the quantity of data bins to be below the bin quantity limit. The method 500 may repeat 512 and 514 until the quantity of data bins no longer exceeds the bin quantity limit.

In cases where histograms are being merged together, the method 500 may defer scaling until the histograms are fully merged in order to alleviate excessive usage of computational resources. For example, the sparse exponential histogram representation may result from the merging of a plurality of histogram representations and is temporarily stored in volatile or otherwise short-term memory. During the merge process, data bins in excess of the bin quantity limit may be maintained until after the merge is complete such that scaling of the sparse exponential histogram may occur only after the merge. Thus, computing resources may be saved to mitigate operational costs and computational costs in merging the histograms.

The method 500 further includes recording the scaling factor to the sparse exponential histogram representation, at 518. The scaling factor may be recorded as a numerical value that may indicate a number of times that the sparse exponential histogram was scaled responsive to exceeding the bin quantity limit. For example, the scaling factor may be stored to the sparse exponential histogram representation in order to properly calculate bin size based on the scaling factor at a later time.

The method 500 includes increasing a frequency count for the data bin mapped to the data value, at 520. The sparse exponential histogram representation may include a data structure that is configured to track counts or frequency counts for each data bin tracked by the sparse exponential histogram representation. The frequency count may correspond to a quantity of data values that fall within a given data value range of a given data bin.

The method 500 includes determining whether additional data values remain in the distribution of the performance metric, at 522. Based on a determination that additional data values do remain, the method continues to 504. Based on a determination that additional data values do not remain, the method continues to 524.

The method concludes by outputting the sparse exponential histogram representation, at 524. The outputted sparse exponential histogram representation may also be referred to as a final sparse exponential histogram representation. The final sparse exponential histogram representation may include data that may be used to reconstruct a histogram from the final sparse exponential histogram representation. For example, the final sparse exponential histogram representation may include a final scaling factor indicating a final scale applied to the bin size parameter. As another example, the final sparse exponential histogram representation may also include an indication of each bin for which at least one data value of the distribution mapped to one of the data value ranges of the exponential histogram determined according to the bin size parameter scaled according to the final scaling factor. As another example, the final sparse exponential histogram representation may also include a respective count of data values of the distribution mapped to each bin indicated in the final sparse exponential histogram representation.

Figure 6:
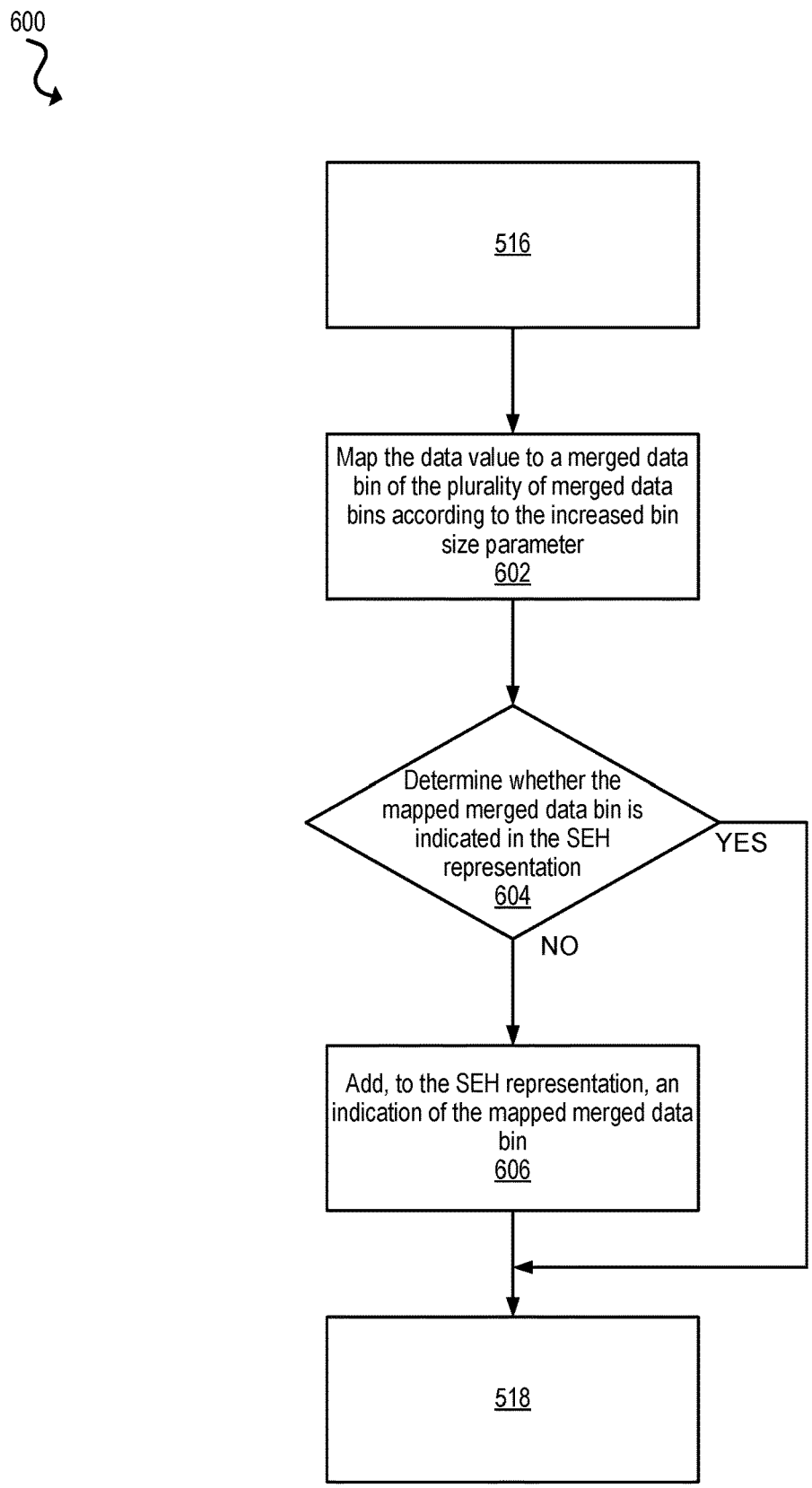
FIG. 6 illustrates a flowchart diagram for a method for determining whether to add an indication of a data bin to a sparse exponential histogram, according to some embodiments.

FIG. 6 illustrates a flowchart diagram for a method 600 that expands on the method 500, according to some embodiments.

The method 600 begins at 516 of FIG. 5 such that adding an indication of an additional data bin to the sparse exponential histogram representation would exceed the bin quantity limit and that adjacent sets of data bins have been merged.

The method 600 includes mapping the data value to a merged data bin of the plurality of merged data bins according to the increased bin size parameter, at 602. After scaling the sparse exponential histogram representation, the data value may be mapped to data bins of the scaled sparse exponential histogram representation. In some embodiments, the mapped data bin for the data value may shift as a result of scaling the sparse exponential histogram.

The method 600 includes determining whether the mapped merged data bin is indicated in the sparse exponential histogram representation, at 604. In some situations, merging the data bins may cause a represented data bin (e.g., the data bin is non-zero) to be merged with an unrepresented data bin (e.g., the data bin is zero). A determination may be made as to whether, after the merging of the data bins, the data value now falls within a data value range of a merged data bin. Based on a determination that the data value is mapped to a data bin of the merged data bins, the method 600 continues on to 518 of method 500 of FIG. 5.

Based on a determination that the data value is not mapped to a data bin of the merged data bins, the method 600 includes adding, to the sparse exponential histogram representation, an indication of the mapped data bin, at 604. After merging the adjacent sets of data bins, a current quantity of data bins would be less than the bin quantity limit, such that adding an indication of another data bin would not exceed the bin quantity limit. In some embodiments, the mapping may be based on a different scaling factor than what has already been indicated in the sparse exponential histogram representation. In order to ensure that the determination is consistent, the method 600 may include determining a scaled data bin based on the plurality of data bins and/or the plurality of merged data bins. The comparison of the mapped merged data bin may be improved by ensuring that similar scaling factors are used in the comparison. The method 600 then returns to 518 of method 500 of FIG. 5.

Figure 7:
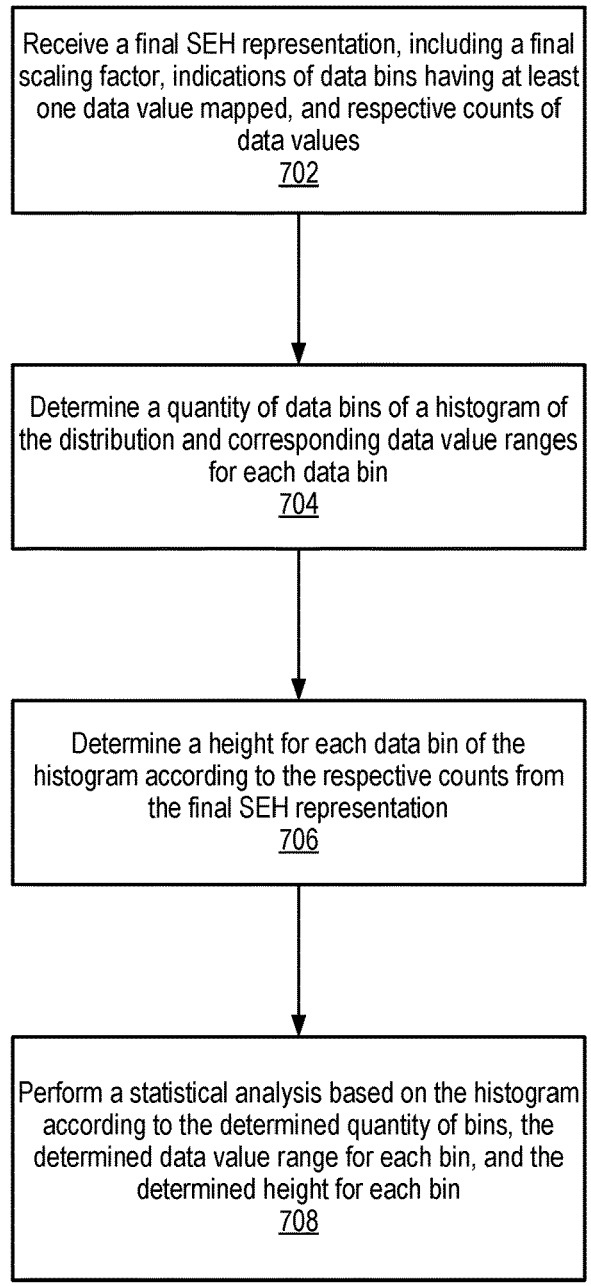
FIG. 7 illustrates a flowchart diagram of a method of generating a histogram from a final sparse exponential histogram representation, according to some embodiments.

FIG. 7 illustrates a flowchart diagram of a method 700 of generating a histogram from a final sparse exponential histogram representation, according to some embodiments. The method 700 may be performed by a metric reporting system, such as metric reporting system 170 of FIG. 1.

The method 700 includes receiving a final sparse exponential histogram representation, including a final scaling factor, indications of data bins having at least one data value mapped, and respective counts of data values, at 702. The final scaling factor may indicate a final scale applied to a bin size parameter of the final sparse exponential histogram representation. The indications of data bins may include an indication of each bin for which at least one data value of the distribution mapped to one of the data value ranges of the exponential histogram determined according to the bin size parameter scaled according to the final scaling factor. The respective counts of data values may indicate counts for each bin indicated in the final sparse exponential histogram representation.

The method 700 may also include determining a quantity of data bins of a histogram of the distribution and corresponding data value ranges for each data bin, at 704. In some embodiments, determining the quantity of data bins may include determining a quantity of bins of the histogram and a corresponding data value range for each bin according to the bin size parameter scaled according to the final scaling factor from the final sparse exponential histogram representation. In some embodiments, different data bins may have different scaling factors such that the quantity of data bins may be determined based on the different scaling factors.

The method 700 may include determining a height for each bin of the histogram according to the respective counts from the final sparse exponential histogram representation, at 706. In some embodiments, the respective counts may indicate a quantity of data values that have been tracked or counted during the generation of the final sparse exponential histogram representation that fall within a data value range for the respective data bin.

The method 700 may conclude by generating presentation data for the histogram according to the determined quantity of bins, the determined data value range for each bin, and the determined height for each bin, at 708. The presentation data may be utilized by a user interface or application that can graphically display the histogram as a plot, such as depicted by plot 400 of FIG. 4. The presentation data may correlate the heights for the data bins and the quantity of the data bins such that a given data bin should be displayed with a respective height. The presentation data may be interpreted by at least one of clients 150 or another service 110 of FIG. 1. The presentation data may be stored to data store 140 and/or data store 160 of FIG. 1 for later retrieval.

Figure 8:
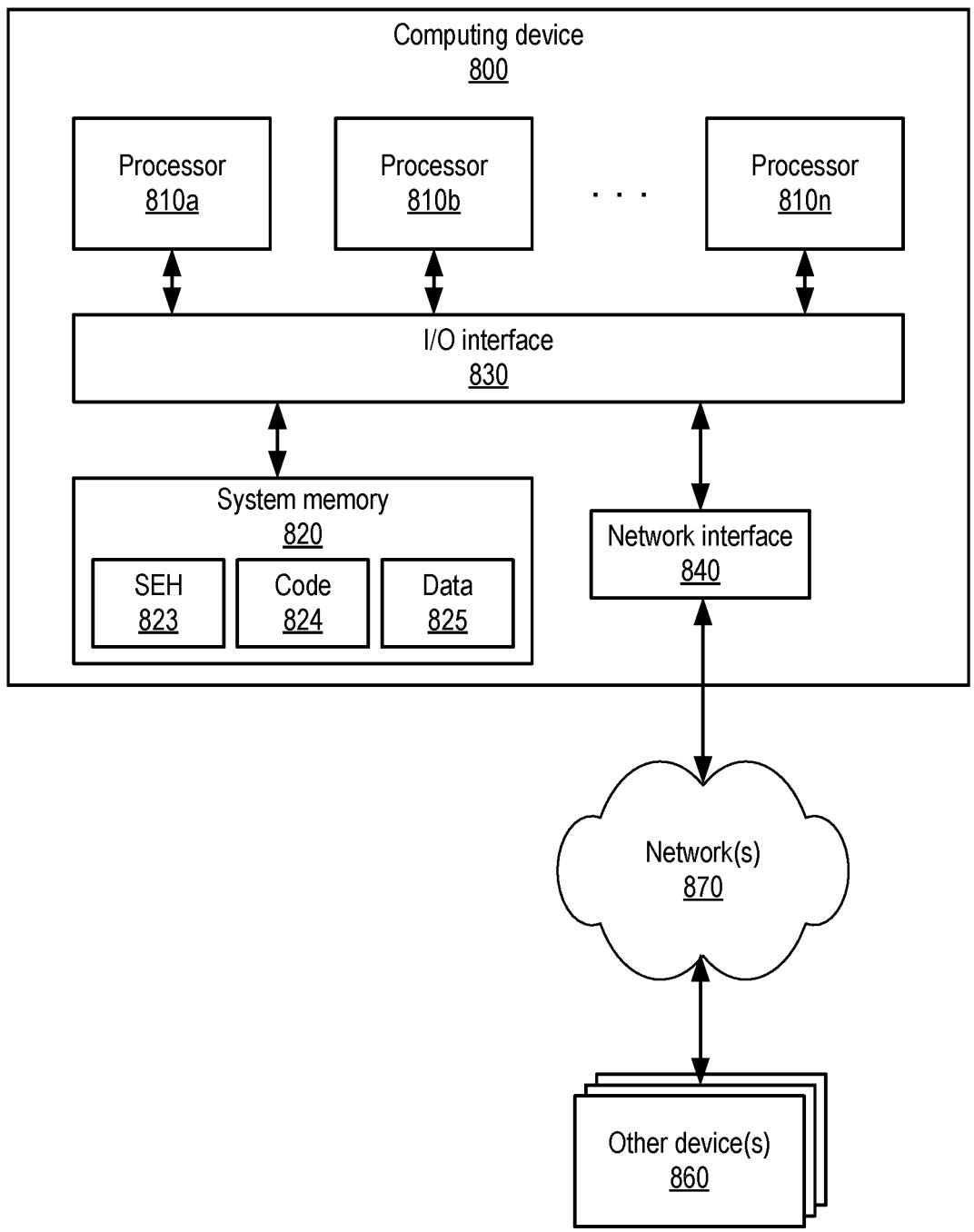
FIG. 8 is a block diagram illustrating an example computer system that may be used in some embodiments.

Any of various computer systems may be configured to implement techniques for tracking a count of a quantity of items in a data store, as disclosed herein. For example, FIG. 8 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the ×106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the generating a dynamic sparse exponential histogram are shown stored within system memory 820 as program instructions 824. In some embodiments, system memory 820 may include data 825 which may be configured as described herein. In some embodiments, system memory 820 may include sparse exponential histogram representation 823 to be generated and analyzed.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between client devices (e.g., 860, etc.) and other computer systems, or among hosts, for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks 870, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, which may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a network-based service implemented by a plurality of computers, wherein the network-based service is configured to provide one or more services to a plurality of clients over a network;
one or more computing devices comprising respective processors and memories storing program instructions for a data compression engine that, when executed on or across the one or more computing devices, cause the one or more computing devices to generate a sparse exponential histogram (SEH) representation of a distribution of a plurality of data values of a performance metric of the network-based service, wherein to generate the SEH representation, the program instructions cause the one or more computing devices to:
for each data value of the plurality of data values, map the data value to a bin of an exponential histogram having a plurality of bins each representing a data value range according to a bin size parameter for the exponential histogram;
determine whether the mapped bin is currently indicated in the SEH representation of the distribution, wherein for each bin indicated in the SEH representation, the SEH representation includes a count of the quantity of data values mapped to that bin;
responsive to a determination that the mapped bin is not currently indicated in the SEH representation, determine whether adding an indication of the mapped bin would exceed a bin quantity limit for the SEH representation;
responsive to a determination that the bin quantity limit would be exceeded:
determine a scaling factor based at least in part on a quantity of times that the bin quantity limit was exceeded during generation of the SEH representation;
increase the bin size parameter according to the scaling factor to expand the respective data value range covered by each bin;
merge bins indicated in the SEH representation according to the expanded data value ranges to reduce the quantity of bins indicated in the SEH representation to be below the bin quantity limit; and
indicate the scaling factor in the SEH representation.

2. The system of claim 1, wherein the data compression engine is further configured to output a final SEH representation of the distribution once all data values of the distribution have been mapped to respective bins and counted, wherein the final SEH representation is a sparse representation of the exponential histogram in that bins of the exponential histogram determined according to the bin size parameter scaled according to the final scaling factor for which no corresponding data value was present in the distribution are not indicated in the final SEH representation, and wherein the final SEH representation comprises:
a final scaling factor indicating a final scale applied to the bin size parameter;
an indication of each bin for which at least one data value of the distribution mapped to one of the data value ranges of the exponential histogram determined according to the bin size parameter scaled according to the final scaling factor; and
a respective count of data values of the distribution mapped to each bin indicated in the final SEH representation.

3. The system of claim 2, wherein the one or more computing devices further comprise program instructions for a metric reporting system configured to receive the final SEH representation and generate a histogram of the distribution, wherein to generate the histogram the program instructions for the metric reporting system further cause the one or more respective processors to:
determine a quantity of bins of the histogram and a corresponding data value range for each bin according to the bin size parameter scaled according to the final scaling factor from the final SEH representation;
determine a height for each bin of the histogram according to the respective counts from the final SEH representation, wherein for bins not indicated in the final SEH representation the height is determined to be zero; and
perform a statistical analysis based on the histogram according to the determined quantity of bins, the determined data value range for each bin, and the determined height for each bin.

4. The system of claim 1, wherein to generate the sparse exponential histogram representation, the data compression engine is configured to:
for each data value of the plurality of data values, increment the count in the SEH representation for the bin to which the data value is mapped according to the respective data value ranges.

5. The system of claim 1, wherein to merge bins indicated in the SEH representation according to the expanded data value ranges, the data compression engine is configured to combine the counts in the SEH representation for adjacent bins indicated in the SEH representation that are covered by a same expanded data value range.

6. A method, comprising:
for each data value of a plurality of data values of a performance metric, mapping the data value to a bin of an exponential histogram of a distribution of the plurality of data values having a plurality of bins each representing a data value range according to a bin size parameter for the exponential histogram;

determining whether the mapped bin is currently indicated in a sparse exponential histogram (SEH) representation of the distribution;

responsive to a determination that the mapped bin is not currently indicated in the SEH representation, determining whether adding an indication of the mapped bin would exceed a bin quantity limit for the SEH representation;

responsive to a determination that the bin quantity limit would be exceeded:

determining a scaling factor based at least in part on a quantity of times that the bin quantity limit was exceeded during generation of the SEH representation;

increasing the bin size parameter according to the scaling factor;

merging bins indicated in the SEH representation according to the bin size parameter; and indicating the scaling factor in the SEH representation.

7. The method of claim 6, further comprising outputting a final SEH representation of the distribution once all data values of the distribution have been mapped to respective bins and counted, wherein the final SEH representation comprises:

a final scaling factor indicating a final scale applied to the bin size parameter;

an indication of each bin for which at least one data value of the distribution mapped to one of the data value ranges of the exponential histogram determined according to the bin size parameter scaled according to the final scaling factor; and a respective count of data values of the distribution mapped to each bin indicated in the final SEH representation.

8. The method of claim 7, wherein the final SEH representation is a sparse representation of the exponential histogram in that bins of the exponential histogram determined according to the bin size parameter scaled according to the final scaling factor for which no corresponding data value was present in the distribution are not indicated in the final SEH representation.

9. The method of claim 7, further comprising:

receiving, at a metric reporting system, the final SEH representation; and generating a histogram of the distribution, comprising:

determining a quantity of bins of the histogram and a corresponding data value range for each bin according to the bin size parameter scaled according to the final scaling factor from the final SEH representation;

determining a height for each bin of the histogram according to the respective counts from the final SEH representation, wherein for bins not indicated in the final SEH representation the height is determined to be zero; and perform a statistical analysis based on the histogram according to the determined quantity of bins, the determined data value range for each bin, and the determined height for each bin.

10. The method of claim 6, further comprising:

for each data value of the plurality of data values, incrementing the count in the SEH representation for the bin to which the data value is mapped according to the respective data value ranges.

11. The method of claim 6, wherein merging bins indicated in the SEH representation according to the expanded data value ranges comprises combining the counts in the SEH representation for adjacent bins indicated in the SEH representation that are covered by a same expanded data value range.

12. The method of claim 6, further comprising determining the bins indicated in the SEH representation to be merged, wherein the bins comprise a subset of bins indicated in the SEH representation, wherein different subsets of bins have respective bin size parameters.

13. The method of claim 6, wherein the scaling factor indicated in the SEH representation indicates a number of times a base scaling factor has been applied to the bin size parameter, and wherein the scaling factor indicates the quantity of times that the bin quantity limit was exceeded during generation of the SEH representation.

14. One or more non-transitory, computer-readable storage media storing instructions that, when executed one or across one or more processors, cause the one or more processors to:

for each data value of a plurality of data values of a performance metric, map the data value to a bin of an exponential histogram of a distribution of the plurality of data values having a plurality of bins each representing a data value range according to a bin size parameter for the exponential histogram;

determine whether the mapped bin is currently indicated in a sparse exponential histogram (SEH) representation of the distribution;

responsive to a determination that the mapped bin is not currently indicated in the SEH representation, determine whether adding an indication of the mapped bin would exceed a bin quantity limit for the SEH representation;

responsive to a determination that the bin quantity limit would be exceeded:

determine a scaling factor based at least in part on a quantity of times that the bin quantity limit was exceeded during generation of the SEH representation;

increase the bin size parameter according to the scaling factor;

merge bins indicated in the SEH representation according to the bin size parameter; and indicate the scaling factor in the SEH representation.

15. The one or more non-transitory, computer-readable storage media of claim 14, further comprising instructions that, to generate the sparse exponential histogram representation, cause the one or more processors to:

for each data value of the plurality of data values, increment the count in the SEH representation for the bin to which the data value is mapped according to the respective data value ranges.

16. The one or more non-transitory, computer-readable storage media of claim 14, further comprising instructions that, to merge bins indicated in the SEH representation according to the expanded data value ranges, cause the one or more processors to combine the counts in the SEH representation for adjacent bins indicated in the SEH representation that are covered by a same expanded data value range.

17. The one or more non-transitory, computer-readable storage media of claim 14, further comprising instructions that cause the one or more processors to:

responsive to merging the bins, determine whether adding the indication of the additional data bin would exceed the bin quantity limit for the SEH representation; and responsive to a determination that the bin quantity limit would be exceeded, increase the bin size parameter by another scaling factor;

merge the merged bins indicated in the SEH representation according to the bin size parameter; and indicate the scaling factor in the SEH representation.

18. The one or more non-transitory, computer-readable storage media of claim 14, wherein the scaling factor indicated in the SEH representation indicates a number of times a base scaling factor has been applied to the bin size parameter.

19. The one or more non-transitory, computer-readable storage media of claim 14, further comprising instructions that cause the one or more processors to output a final SEH representation of the distribution once all data values of the distribution have been mapped to respective bins and counted, wherein the final SEH representation comprises:

one or more final scaling factors indicating one or more final scales applied to the bin size parameter for the respective bins;

an indication of each bin for which at least one data value of the distribution mapped to one of the data value ranges of the exponential histogram determined according to the bin size parameter scaled according to the final scaling factor; and a respective count of data values of the distribution mapped to each bin indicated in the final SEH representation.

20. The one or more non-transitory, computer-readable storage media of claim 14, further comprising instructions that, responsive to merging bins indicated in the SEH representation according to the bin size parameter, cause the one or more processors to:

map the data value to a merged bin of the merged bins according to the increased bin size parameter;

determine whether the mapped merged bin is indicated in the SEH representation; and responsive to a determination that the mapped merged bin is not indicated in the SEH representation, add an indication of the mapped merged data to the SEH representation.

\* \* \* \* \*